(12) United States Patent
Pochiraju et al.

(10) Patent No.: US 11,410,383 B2
(45) Date of Patent: Aug. 9, 2022

(54) AUTOMATED COMPONENT DESIGN EXTRACTION

(71) Applicant: THE BOEING COMPANY, Chicago, IL (US)

(72) Inventors: Harsha Jithendra Pochiraju, Bengaluru (IN); Joseph Mattathil, Bangalore (IN); Pattada Kallappa, Bangalore (IN); Ranga Rao Gogulamanda, Bengaluru (IN); Rejo Jayaraj, Bangalore (IN)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/851,498

(22) Filed: Apr. 17, 2020

(65) Prior Publication Data
US 2021/0327134 A1   Oct. 21, 2021

(51) Int. Cl.
*G06T 17/10*   (2006.01)
*G06T 7/00*   (2017.01)

(52) U.S. Cl.
CPC ............... *G06T 17/10* (2013.01); *G06T 7/001* (2013.01); *G06T 7/0008* (2013.01); *G06T 2207/10028* (2013.01); *G06T 2207/30164* (2013.01); *G06T 2210/56* (2013.01)

(58) Field of Classification Search
CPC ..... G06F 17/18; G06K 9/00214; G06T 17/00; G06T 2210/56
See application file for complete search history.

(56) References Cited

U.S. PATENT DOCUMENTS

| | | | |
|---|---|---|---|
| 2015/0096426 A1* | 4/2015 | Culver | A43B 17/00 84/322 |
| 2016/0071318 A1* | 3/2016 | Lee | G06T 17/00 345/419 |
| 2017/0140539 A1* | 5/2017 | Wang | G06T 7/73 |
| 2017/0161945 A1* | 6/2017 | Robert | G06T 17/005 |
| 2017/0193696 A1* | 7/2017 | Mazula | G06T 11/60 |
| 2018/0068169 A1* | 3/2018 | Williams | G06K 9/00214 |
| 2018/0147062 A1* | 5/2018 | Ay | A61F 2/30942 |
| 2020/0126208 A1* | 4/2020 | Ponto | G06T 19/20 |

* cited by examiner

*Primary Examiner* — Ming Wu
(74) *Attorney, Agent, or Firm* — Womble Bond Dickinson (US) LLP

(57) ABSTRACT

A method for modeling a physical component is provided, the method comprising scanning the component to generate a point cloud, generating definitions of surfaces of the component from the point cloud, identifying vertices of edges at which the surfaces of the component meet, and converting the point cloud to a corresponding parameterized digital model of the component. In some example implementations, generating the definitions for a surface comprises: selecting data points of the point cloud that are within a determined spatial range from a frame of reference, identifying a planar surface formed by those data points that conform to a collinear pattern within the determined spatial range from the frame of reference or a cylindrical surface formed by those of the plurality of data points that do not conform to a collinear pattern and generating the definition of the surface from the planar or cylindrical surface as identified.

18 Claims, 4 Drawing Sheets

AUTOMATED COMPONENT DESIGN EXTRACTION

TECHNOLOGICAL FIELD

The present disclosure relates generally to modeling physical components and, in particular, to automatically extracting design information from physical components.

BACKGROUND

In many modern manufacturing operations, it is increasingly important to be able to effectively extract and verify design information from physical components. In situations where multiple suppliers and supply chains are used in the development and manufacture of sophisticated vehicles or other complex products, the components that are ultimately used in production may be subject to design changes during the manufacturing process or otherwise deviate from the original design. As such, when additional copies of the components are needed for repair or further production, the additional parts may not match the originally produced components, absent efforts to capture, verify, and document the actual design of the relevant physical components.

Conventional approaches to extracting design information from physical components are frequently hampered by numerous technical challenges and inefficiencies. Such conventional approaches often rely heavily on human judgment and estimation when attempting to convert images of physical components to CAD models or other data formats that can be more readily compared to existing design documentation. In addition to the significant delays imposed by involving extensive human interaction with images and other data, the subjectivity involved with an individual user's perspective and judgment can limit the accuracy of any developed drawings or further analysis.

BRIEF SUMMARY

Example implementations of the present disclosure are directed to modeling a physical component by extracting design information from the component. In particular, example implementations allow for the conversion of scanned data in the form of a three-dimensional point cloud into a parameterized digital model of the physical component that defines the planar and curved surfaces of the component, vertices where the various surface edges meet, and any voids in the component without requiring user-supplied human judgments or estimations. Moreover, since example implementations of the present disclosure can efficiently use all or a substantial portion of the data points in a point cloud, the parameterized digital model of the physical component can identify can accurately and precisely extract and capture design information from the physical component that human-driven and other conventional approaches to design extraction are often unable to identify.

It will be appreciated that example implementations of the present disclosure generally involve scanning a physical component to generate a point cloud, such as a three-dimensional point cloud. Definitions for each of the surfaces are then automatically generated for each of the surfaces. In some such example implementations, a definition of a surface can be generated by selecting a plurality of data point of the point cloud that are within a determined spatial range from a frame of reference, identifying a planar surface where the data points conform to a collinear pattern with in the spatial range or a cylindrical surface in instances where the points do not conform to a collinear pattern, and generating a definition of the surface from the identified planar or cylindrical surface. After the surfaces are identified, vertices of edges, where the surfaces of the physical component meet one another are identified and the surface definitions and vertex identifications are used as parameters to convert the cloud point data into a digital model of the physical component.

The present disclosure thus includes, without limitation, the following example implementations.

Some example implementations provide a method for modeling a physical component, the method comprising scanning the physical component to generate a point cloud; generating definitions of surfaces of the physical component from the point cloud, generating the definitions comprising for at least a surface of the surfaces: selecting a plurality of data points of the point cloud that are within a determined spatial range from a frame of reference, identifying a planar surface formed by those of the plurality of data points that conform to a collinear pattern of data points within the determined spatial range from the frame of reference or a cylindrical surface formed by those of the plurality of data points that do not conform to a collinear pattern of data points within the determined spatial range from the frame of reference, and generating the definition of the surface from the planar or cylindrical surface as identified; identifying vertices of edges at which the surfaces of the physical component meet one another; and converting the point cloud to a corresponding digital model of the physical component, including parameterizing the corresponding digital model with the definitions of the surfaces and indications of the vertices.

In some example implementations of the method of any preceding example implementation, or any combination of any preceding example implementations, the method further comprises determining whether a void is present in any of the surfaces, including for at least the surface, detecting whether a distance between adjacent data points for the surface exceeds a determined distance, and parameterizing the corresponding digital model includes parameterizing the corresponding digital model further with an indication of the void.

In some example implementations of the method of any preceding example implementation, or any combination of any preceding example implementations, the surface is a planar surface, and generating the definitions of the surfaces further comprises for at least the surface: identifying a plane that passes through a subset of the plurality of data points within the determined spatial range from the frame of reference; defining the surface based on at least three data points in the plane; and including the definition of the surface as a parameter of the corresponding digital model.

In some example implementations of the method of any preceding example implementation, or any combination of any preceding example implementations, the surface is a cylindrical surface, and generating the definitions of the surfaces further comprises for at least the surface: identifying a circle that passes through a subset of the plurality of data points within the determined spatial range from the frame of reference; defining the cylindrical surface based on position information for a center point of the circle and a radius of the circle; and including the definition of the surface as a parameter of the corresponding digital model.

In some example implementations of the method of any preceding example implementation, or any combination of any preceding example implementations, identifying the vertex between the surface and the second surface comprises: determining a line of intersection between the surface and a second surface; and defining the vertex as a point on the line of intersection between the surface and the second surface.

In some example implementations of the method of any preceding example implementation, or any combination of any preceding example implementations, the method further comprises comparing parameters of the digital model, as parameterized, to corresponding parameters of an authoritative digital model of a second physical component; and identifying any deviations between the parameters of the digital model and the corresponding parameters of the authoritative digital model of the second physical component.

Some example implementations provide an apparatus for modeling a physical component, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for modeling a physical component, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
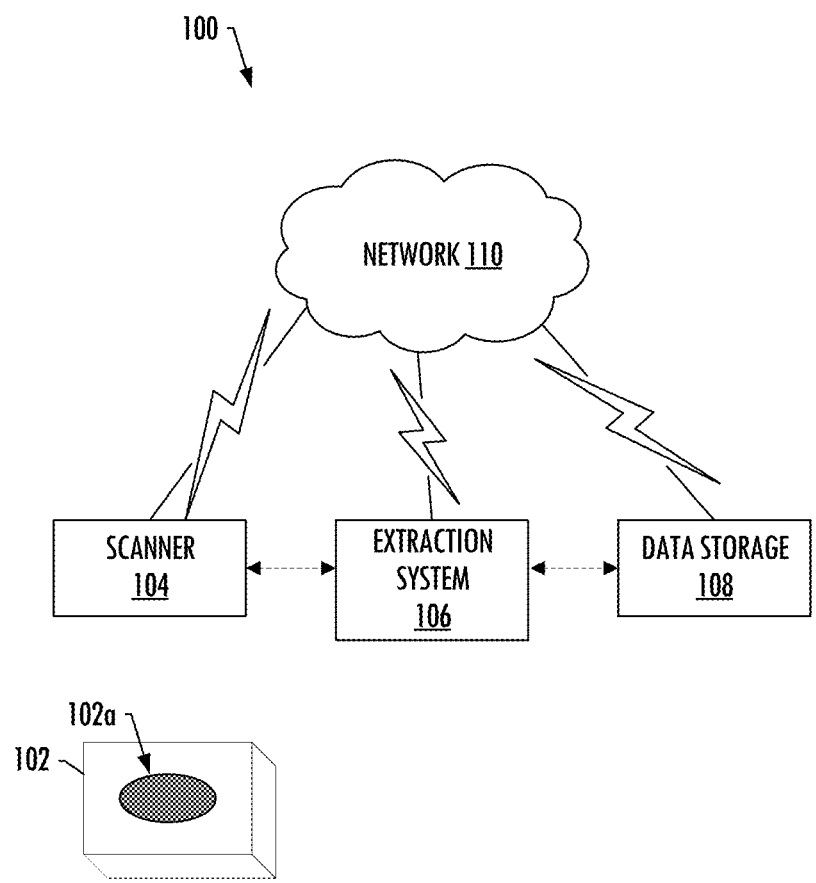
FIG. 1 illustrates a system for modeling a physical component, according to example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout. In addition, terms such as "includes," "including," "has," "contains," and variants thereof are used herein, are intended to be inclusive in a manner similar to the term "comprises" as an open transition word without precluding any additional or other elements.

Example implementations of the present disclosure are directed to modeling a physical component by extracting design information from the component. In particular, example implementations allow for the conversion of scanned data in the form of a three-dimensional point cloud into a parameterized digital model of the physical component that defines the planar and curved surfaces of the component, vertices where the various surface edges meet, and any voids in the component without requiring user-supplied human judgments or estimations. Moreover, since example implementations of the present disclosure can efficiently use all or a substantial portion of the data points in a point cloud, the parameterized digital model of the physical component can be utilized to identify and accurately and precisely extract and capture design information from the physical component that human-driven and other conventional approaches to design extraction are often unable to identify.

It will be appreciated that example implementations of the present disclosure generally involve scanning a physical component to generate a point cloud, such as a three-dimensional point cloud. Definitions for each of the surfaces are then automatically generated for each of the surfaces. In some such example implementations, a definition of a surface can be generated by selecting a plurality of data points of the point cloud that are within a determined spatial range from a frame of reference, identifying a planar surface where the data points conform to a collinear pattern with in the spatial range or a cylindrical surface in instances where the points do not conform to a collinear pattern, and generating a definition of the surface from the identified planar or cylindrical surface. After the surfaces are identified, vertices of edges, where the surfaces of the physical component meet one another are identified and the surface definitions and vertex identifications are used as parameters to convert the cloud point data into a digital model of the physical component.

FIG. 1 illustrates a system 100 for modeling a physical component, according to example implementations of the present disclosure. The system may include any of a number of different subsystems (each an individual system) for performing one or more functions or operations. As shown, in some examples, the system includes physical component 102, scanner 104, extraction system 106, and data storage system 108. The subsystems including the scanner 104, extraction system 106, and data storage system 108 may be co-located or directly coupled to one another, or in some examples, various ones of the subsystems may communicate with one another across one or more computer networks 110. Further, although shown as part of the system 100, it should be understood that any one or more of the above may function or operate as a separate system without regard to any of the other subsystems. It should also be understood that the system may include one or more additional or alternative subsystems than those shown in FIG. 1.

Example implementations of the present disclosure are directed to extracting design information from a physical component and using the extracted design information to create a digital model of the physical component. As shown in FIG. 1, the physical component 102 is a three-dimensional object that may be a component of a product or other system. Some example implementations of the present disclosure arise in the context of the manufacture of vehicles, such as aircraft. As such, the physical component may be, for example, a vehicle component, an engine component, a seat, a fastener, a container, a casing, a control surface, a tool, a structural element, a decorative element, and the like. As shown in FIG. 1, the physical object 102 may include a void 102a on one or more surfaces, such as a hole, depression, cut-out, or other break or disruption in the continuity of a plane or arcuate surface.

In example implementations involving the system 100 or similar systems, the scanner 104 is used to scan the surfaces of the physical object 102 and generate a point cloud. In some example implementations, the scanner 104 is a three-dimensional scanner configured to capture images and/or other image data of multiple surfaces of a given physical object 102. In some situations, the point cloud takes the form of a data file or other set of data including the positions of a plurality of points representing points on the surfaces of the physical component 102. It will be appreciated that while the scanner 104 is shown as being separate from the extraction system 106, the scanner 104 may be integrated into the extraction system 106. In example implementations of system 100, the extraction system 106 may be a computer or other device configured to convert the point cloud generated through scanning the physical component 102 into a parameterized digital model of the physical component 102. In some example implementations, the extraction system 106 generates definitions of the surfaces of the physical component 102, such as by selecting a plurality of data points of the point cloud that are within a determined spatial range from a frame of reference, identifying a planar surface or a cylindrical surface based on whether the plurality of data points conform to a collinear pattern, and generating a definition of the surface (such as by identifying three points, in the case of a planar surface, or a center point of a circle and a radius of the circle, in the case of a cylindrical surface, for example) as identified. After identifying and defining the surfaces of the physical component 102 based on the point cloud data, the vertices of the edges are identified by the extraction system 106 by, for example, determining where multiple surfaces intersect and identifying the vertices as one or more points on the line where surfaces intersect. In instances where three or more surfaces meet, the vertex may be identified as the point where the lines formed by the intersecting planes intersect with each other, for example.

After identifying the vertices, the extraction system 106 converts the point cloud to a corresponding digital model of the physical component 102 with the definitions of the surfaces and indications of the vertices as parameters of the digital model. In instances where the physical component has a void in a surface (such as shown in FIG. 1 as void 102a in physical component 102, for example), the presence of the void can be determined by detecting whether a distance between adjacent data points for the surface exceeds a determined distance, and parameterizing the corresponding digital model with an indication of the void.

As shown in FIG. 1, system 100 may include a data storage system 108, such as a database, server, or the like, which can be separate from the extraction system 106 (and either directly in communication with the extraction system 106, or indirectly in communication with the extraction system 106 via a network 110), or incorporated with the extraction system 106. Regardless of the exact configuration of the data storage system 108, the data storage system may allow one or more system components to access digital models and other information about physical components. For example, data storage system 108, may contain an authoritative digital model (such as an official design document, CAD drawing, or other model, for example) of one or more physical components that can be compared by the extraction system 106 against the model constructed by the extraction system 106 based on the scanned point cloud data, and deviations between the models can be identified. In some example implementations, the identified deviations may be provided to a user, and may be displayed via a display device. In some example implementations, the digital model generated by the extraction system 106 is stored in the data storage system 108, and may be associated with one or more other relevant data records, depending on the type of component and/or the overall configuration of the data stored in the data storage system 108.

Figure 2A:
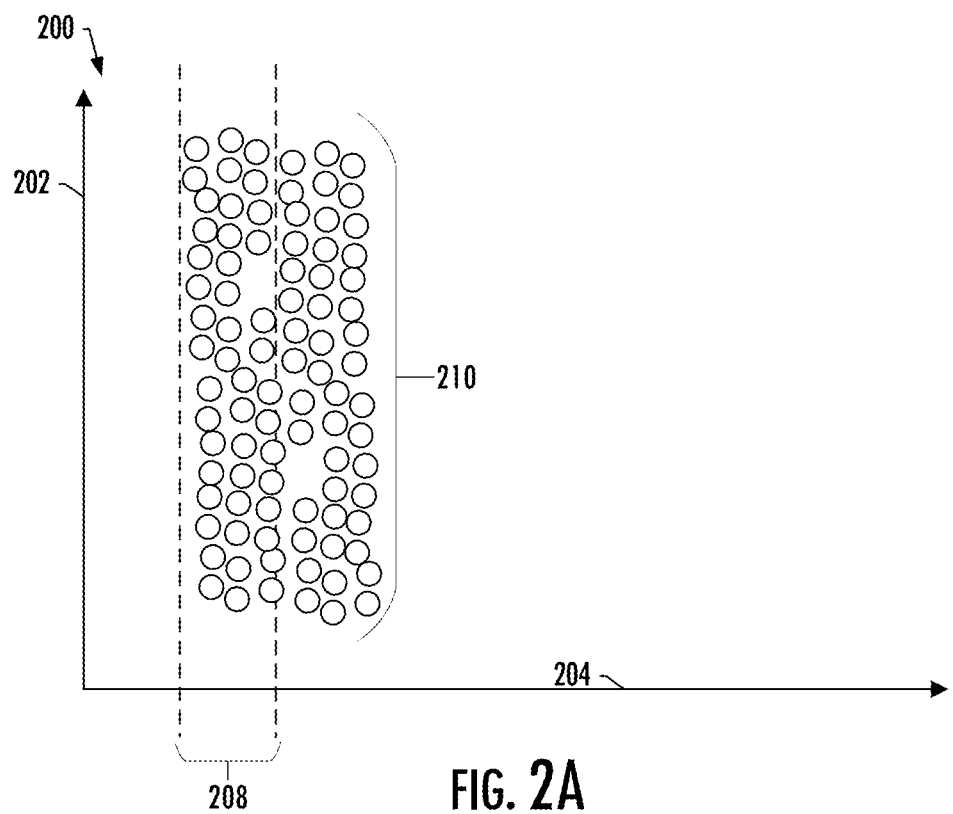
FIG. 2A illustrates aspects of identifying a planar surface, according to example implementations of the present disclosure.

FIG. 2A illustrates aspects of identifying a planar surface, according to example implementations of the present disclosure. As shown in FIG. 2A, the frame of reference 200 is defined by the Y-axis 202 and the X-axis 204. Multiple points 210 from a point cloud are shown, and a spatial range 208 is defined within the frame of reference 200. To identify the planar surface established by the points 210, the extraction system 106 determines the distance of all points along the X-axis 204 from the Y-Z plane (shown as Y-axis 202), and selects the farthest and closest set of points within the spatial range 208. As an example, the spatial range 208 can be predetermined. It will be appreciated that the width and/or other dimension of the spatial range 208 may be defined (e.g., based on user input) based on the manufacturing process associated with the relevant physical component. For example, in instances where the planar surface is expected to be a ground metallic surface, the spatial range 208 may be set at 0.001 millimeter, or a similar size. In another example, such as where the planar surface is expected to be that of a cast surface, the spatial range 208 may be set at 0.01 millimeter, or a similar size. The extraction system 106 can then iteratively progress through all of the points neighboring the nearest point, farthest point, or another point, to check for a collinear pattern for all points within the spatial range 208. In some example implementations, the collinearity of data points in the point cloud is determined by comparing the slope between two points, with a value of the slope approaching zero indicating collinearity. The best plane that passes through the points 210 can be determined by identifying and selecting three points such that they are the farthest or near-farthest along the relevant Z-axis and Y-axis 202, and equidistant from the maximum number of points along the X-axis 204. Those three points (or any three other points in the plane, for example) are then set as the definition of the relevant plane.

Figure 2B:
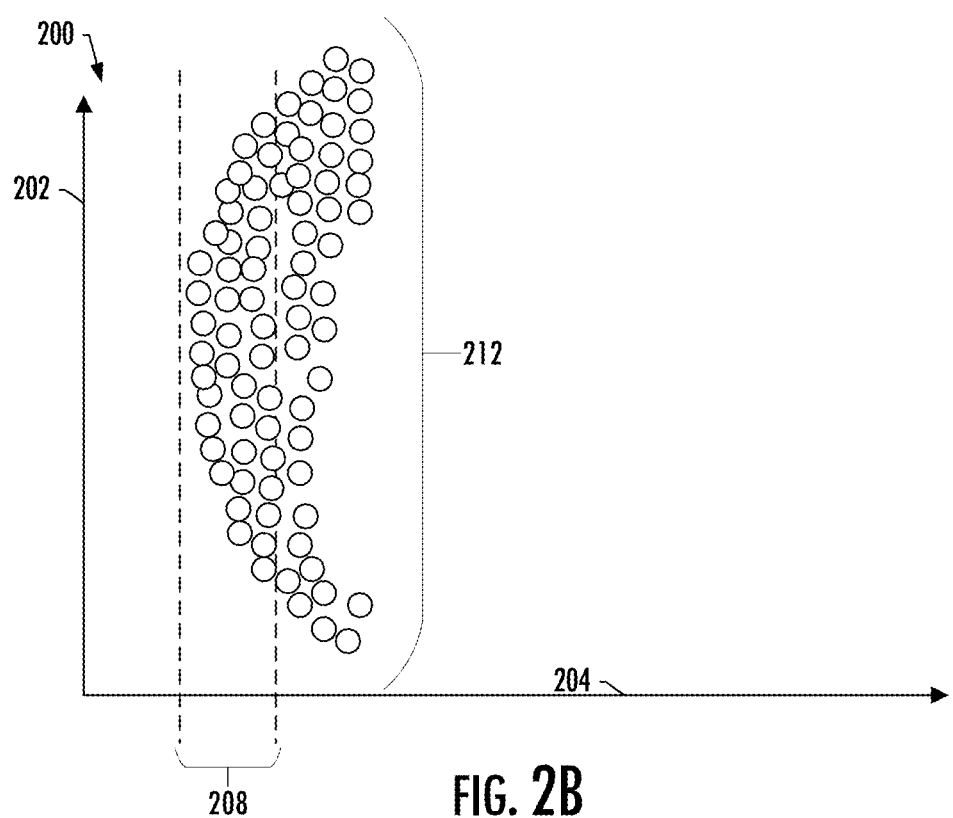
FIG. 2B illustrates aspects of identifying a cylindrical surface, according to example implementations of the present disclosure.

FIG. 2B illustrates aspects of identifying a cylindrical surface, according to example implementations of the present disclosure. As in FIG. 2A, the frame of reference 200 is defined by the Y-axis 202 and the X-axis 204. Multiple points 212 from a point cloud are shown, and a spatial range 208 is defined within the frame of reference 200. In situations where the points 212 are found to not be in a collinear pattern (such as in the example shown in FIG. 2B), the extraction system 106 considers the points to be in a circle, such that the surface is cylindrical. It will be appreciated that the terms circle and cylindrical, as they apply to points in a point cloud and/or surfaces, are not intended to indicate a closed circle or a closed cylinder, but rather to reflect one or more arcuate shapes and/or other curves. In such example implementations, where the points 212 are determined to be non-collinear, the extraction system 106 seeks the best-fit circle for the identified points. In some example implementations, the best-fit circle is identified by selecting a set of points, arranging them in ascending order with respect to their Y-coordinates, and, for the three points that are farthest from each other finding the intersection of two lines that are perpendicular to lines connecting two pairs of the selected three points. The intersection is considered to be the center of the circle, and the radius of the circle is determined by identifying a radius that results in a curve where the most points are at a predetermined range from the cylindrical surface established by the curve.

Figure 3:
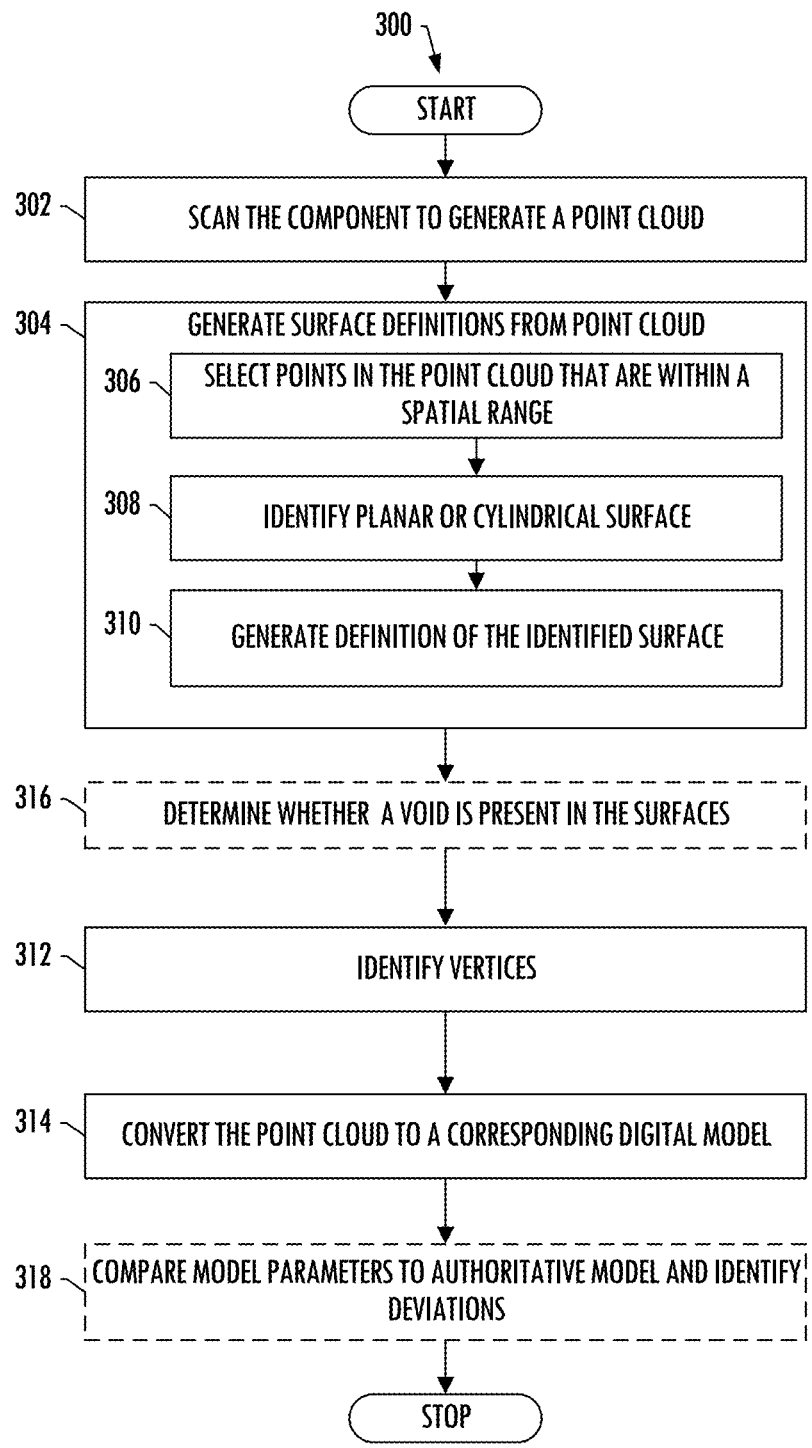
FIG. 3 is a flowchart illustrating various steps in a method of modeling a physical component, according to example implementations.

FIG. 3 is a flowchart illustrating various steps in a method 300 for modeling a physical component, according to example implementations of the present disclosure. As shown at block 302, the method includes scanning the component to generate a point cloud. Some example implementations of block 302 include scanning the physical component to generate a point cloud. In some such example implementations, a scanner, such as scanner 104, is used to generate a three-dimensional point cloud that reflects multiple points on multiple surfaces of the physical component. It will be appreciated that any of the physical components discussed or otherwise disclosed herein with respect to component 102 may be used in example implementations of block 302, including but not limited to vehicle components, engine components, seats, fasteners, containers, casings, control surfaces, tools, structural elements, decorative elements, and the like.

As shown at block 304, the method also includes generating surface definitions from the point cloud. Some example implementations of block 304 include generating definitions of the physical component from the point cloud. One approach to generating a definition of a surface is reflected in blocks 306, 308, and 310. As shown in block 306, generating a surface definition from a point cloud may include selecting points in the point cloud that are within a spatial range. Some example implementations of block 306 involve selecting a plurality of data points from the point cloud that are within a determined range from a point of reference. As shown in block 308, generating a surface definition from a point cloud may also include identifying a planar or cylindrical surface. Some example implementations of block 308 involve identifying a planar surface formed by those of the plurality of data points that conform to a collinear pattern of data points within the determined spatial range from the frame of reference or identifying a cylindrical surface formed by those plurality of data points that do not conform to a collinear patter of data points within the determined spatial range from the frame of reference. As shown in block 310, generating a surface definition for a point cloud may also include generating a definition of the identified surface. Some example implementations of block 310 involve generating the definition of the surface from the planar or cylindrical surface as identified, such as in connection with an example implementation of block 308. It will be appreciated that any of the example implementations discussed or otherwise disclosed in connection with the examples presented in FIG. 2A and FIG. 2B may be used in example implementations of blocks 304, 306, 308, and 310. As noted herein, in some example implementation of block 304, the surface is a planar surface, and generating the definition of the surface includes identifying a plane that passes through a subset of the plurality of data points within the determined spatial range from the frame of reference, defining the surface based on at least three data points in the plane, and including the definition of the surface as a parameter of the corresponding digital model. In some example implementations of block 304, the surface is a cylindrical surface, and generating the definition of the surface includes identifying a circle that passes through a subset of the plurality of data points within the determined spatial range from the frame of reference, defining the cylindrical surface based on position information for a center point of the circle and a radius of the circle, and including the definition of the surface as a parameter of the corresponding digital model.

As shown at block 312, the method also includes identifying the vertices. Some example implementations of block 312 involve identifying vertices of edges at which the surfaces of the physical component meet each other. In some example implementations of block 312, identifying a vertex involves determining a line of intersection between two surfaces and defining the vertex as a point on the line of intersection between the two surfaces. As shown at block 314, the method also includes converting the point cloud to a corresponding digital model. Some example implementations of block 314 involve converting the point cloud to a corresponding digital model of the physical component, including parameterizing the corresponding digital model with the definitions of the surfaces and indications of the vertices.

As shown in FIG. 3 at block 316, some example implementations of the method include determining whether a void is present in the surfaces. Some example implementations of block 316 involve determining whether a void is present in any of the surfaces by detecting whether a distance between adjacent data points for a surface exceeds a defined distance. In some such example implementations, parameterizing the corresponding digital model includes parameterizing the digital model with an indication of the void. As shown at block 318, some example implementations of the method include comparing model parameters to an authoritative model and identifying deviations. Some example implementations of block 318 involve comparing parameters of the digital model, as parameterized, to corresponding parameters of an authoritative digital model of a second physical component and identifying deviations between the parameters of the digital model and the corresponding parameters of the authoritative digital model of the second physical component. In some such example implementations, the authoritative digital model might include CAD or other design documentation, and deviations between the model derived from the physical component and the parameters of the design documentation can be used to determine whether the component conforms to the expected design, reflects a changed design, or otherwise departs from the expected design.

According to example implementations of the present disclosure, the system 100 and its subsystems including the scanner 104, the extraction system 106, and the data storage system 108 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 4:
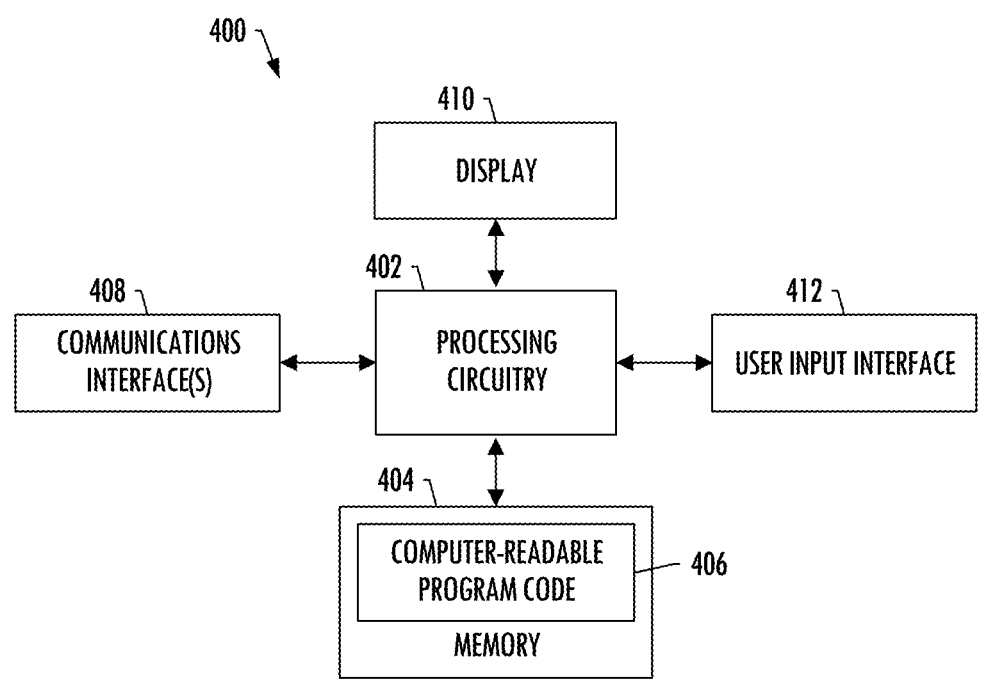
FIG. 4 illustrates an apparatus according to some example implementations.

FIG. 4 illustrates an apparatus 400 according to some example implementations of the present disclosure. Generally, an apparatus (e.g., scanner 104, extraction system 106, data storage 108, one or more devices of network 110, etc.) of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 402 (e.g., processor unit) connected to a memory 404 (e.g., storage device).

The processing circuitry 402 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 404 (of the same or another apparatus).

The processing circuitry 402 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 404 is generally any piece of computer hardware that is capable of storing information such as, for example, data, computer programs (e.g., computer-readable program code 406) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 404, the processing circuitry 402 may also be connected to one or more interfaces for displaying, transmitting and/or receiving information. The interfaces may include a communications interface 408 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 410 and/or one or more user input interfaces 412 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 400 may include a processing circuitry 402 and a computer-readable storage medium or memory 404 coupled to the processing circuitry, where the processing circuitry is configured to execute computer-readable program code 406 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus, comprising:
  a memory configured to store computer-readable program code; and
  processing circuitry configured to access the memory, and execute the computer-readable program code to facilitate performance of operations, comprising:
    receiving data indicative of a point cloud that has been determined based on a scan of a physical component;
    generating definitions of surfaces of the physical component from the point cloud, wherein the generating the definitions comprising for at least a surface of the surfaces:
      defining a spatial range within a frame of reference that includes the point cloud, the spatial range defined to include at least some but not all data points of the point cloud;
      selecting a plurality of the data points of the point cloud that are within the spatial range;
      identifying a planar surface or a cylindrical surface based on whether the plurality of the data points conform to a collinear pattern of data points within the spatial range; and
      generating the definition of the surface from the planar surface or the cylindrical surface as identified;
    identifying vertices of edges at which the surfaces of the physical component meet one another; and
    converting the point cloud to a corresponding digital model of the physical component, comprising parameterizing the corresponding digital model with the definitions of the surfaces and indications of the vertices.

2. The apparatus of claim 1, wherein the operations further comprise:
  determining that a void is present in at least one of the surfaces, comprising for at least the surface, detecting that a distance between adjacent data points for the surface exceeds a defined distance, and
  wherein the parameterizing the corresponding digital model comprises parameterizing the corresponding digital model further with an indication of the void.

3. The apparatus of claim 1, wherein the surface is a planar surface, and the generating the definitions of the surfaces further comprises for at least the surface:
  identifying a plane that passes through a subset of the plurality of the data points within the spatial range;
  defining the surface based on at least three data points in the plane; and
  including the definition of the surface as a parameter of the corresponding digital model.

4. The apparatus of claim 1, wherein the surface is a cylindrical surface, and the generating the definitions of the surfaces further comprises for at least the surface:
  identifying a circle that passes through a subset of the plurality of the data points within the spatial range;
  defining the cylindrical surface based on position information for a center point of the circle and a radius of the circle; and
  including the definition of the surface as a parameter of the corresponding digital model.

5. The apparatus of claim 1, wherein the identifying the vertices comprises identifying a vertex between the surface and a second surface, comprising:
  determining a line of intersection between the surface and a second surface; and
  defining the vertex as a point on the line of intersection between the surface and the second surface.

6. The apparatus of claim 1, wherein the operations further comprise:
comparing parameters of the digital model, as parameterized, to corresponding parameters of an authoritative digital model of a second physical component; and
based on the comparing, identifying a deviation between the parameters of the digital model and the corresponding parameters of the authoritative digital model of the second physical component.

7. A method, comprising:
scanning a physical component to generate a point cloud;
generating definitions of surfaces of the physical component from the point cloud, generating the definitions comprising for at least a surface of the surfaces:
defining a spatial range within a frame of reference that includes the point cloud, the spatial range defined to include at least some but not all data points of the point cloud;
selecting a plurality of the data points of the point cloud that are within the spatial range;
identifying a planar surface or a cylindrical surface based on whether the plurality of the data points conform to a collinear pattern of data points within the spatial range; and
generating a definition of the surface from the planar surface or the cylindrical surface as identified;
identifying vertices of edges at which the surfaces of the physical component meet one another; and
converting the point cloud to a corresponding digital model of the physical component, comprising parameterizing the corresponding digital model with the definitions of the surfaces and indications of the vertices.

8. The method of claim 7, further comprising determining whether a void is present in at least one of the surfaces, comprising for at least the surface, detecting whether a distance between adjacent data points for the surface exceeds a defined distance, and
wherein in response to determining that the void is present in at least one of the surfaces, the parameterizing the corresponding digital model comprises parameterizing the corresponding digital model further with an indication of the void.

9. The method of claim 7, wherein the surface is a planar surface, and generating the definitions of the surfaces further comprises for at least the surface:
identifying a plane that passes through a subset of the plurality of the data points within the spatial range;
defining the surface based on at least three data points in the plane; and
including the definition of the surface as a parameter of the corresponding digital model.

10. The method of claim 7, wherein the surface is a cylindrical surface, and generating the definitions of the surfaces further comprises for at least the surface:
identifying a circle that passes through a subset of the plurality of the data points within the spatial range;
defining the cylindrical surface based on position information for a center point of the circle and a radius of the circle; and
including the definition of the surface as a parameter of the corresponding digital model.

11. The method of claim 7, wherein identifying a vertex between the surface and a second surface comprises:
determining a line of intersection between the surface and the second surface; and
defining the vertex as a point on the line of intersection between the surface and the second surface.

12. The method of claim 7, further comprising:
comparing parameters of the digital model, as parameterized, to corresponding parameters of an authoritative digital model of a second physical component; and
identifying any deviations between the parameters of the digital model and the corresponding parameters of the authoritative digital model of the second physical component.

13. A computer-readable storage medium for modeling a physical component, the computer-readable storage medium being non-transitory and having computer-readable program code stored therein that, in response to execution by processing circuitry, causes an apparatus to at least:
scan the physical component to generate a point cloud;
generate definitions of surfaces of the physical component from the point cloud, generate a definition of the definitions for a surface of the surfaces comprises:
define a spatial range within a frame of reference that includes the point cloud, the spatial range defined to include at least some but not all data points of the point cloud;
select a plurality of the data points of the point cloud that are within the spatial range;
identify a planar surface or a cylindrical surface based on whether the plurality of the data points conform to a collinear pattern of data points within the spatial range; and
generate the definition of the surface from the planar surface or the cylindrical surface as identified;
identify one or more vertices of edges at which the surfaces of the physical component meet one another; and
convert the point cloud to a corresponding digital model of the physical component, comprising parameterize the corresponding digital model with the definitions of the surfaces and indications of the one or more vertices.

14. The computer-readable storage medium of claim 13, wherein the computer-readable storage medium has further computer-readable program code stored therein that, in response to execution by the processing circuitry, causes the apparatus to further at least:
determine that a void is present in any of the surfaces, comprising for at least the surface, detecting that a distance between adjacent data points for the surface exceeds a defined distance, and
wherein the corresponding digital model is further parameterized with an indication of the void.

15. The computer-readable storage medium of claim 13, wherein the surface is a planar surface, and generating the definition of the surface further comprises:
identifying a plane that passes through a subset of the plurality of the data points within the spatial range;
defining the surface based on at least three data points in the plane; and
including the definition of the surface as a parameter of the corresponding digital model.

16. The computer-readable storage medium of claim 13, wherein the surface is a cylindrical surface, and generating the definition of the surface further comprises:
identifying a circle that passes through a subset of the plurality of the data points within the spatial range;
defining the cylindrical surface based on position information for a center point of the circle and a radius of the circle; and including the definition of the surface as a parameter of the corresponding digital model.

17. The computer-readable storage medium of claim 13, wherein identifying a vertex between the surface and a second surface comprises:
- determining a line of intersection between the surface and the second surface; and
- defining the vertex as a point on the line of intersection between the surface and the second surface.

18. The computer-readable storage medium of claim 13, wherein the computer-readable storage medium has further computer-readable program code stored therein that, in response to execution by the processing circuitry, causes the apparatus to further at least:
- compare one or more parameters of the digital model, as parameterized, to one or more corresponding parameters of an authoritative digital model of a second physical component; and
- identify a deviation between the one or more parameters of the digital model and the one or more corresponding parameters of the authoritative digital model of the second physical component.

* * * * *